United States Patent
Hocker et al.

[11] Patent Number: 6,137,476
[45] Date of Patent: Oct. 24, 2000

[54] DATA MOUSE

[75] Inventors: Michael David Hocker, Staatsburg, N.Y.; Daniel James Winarski, Tucson, Ariz.

[73] Assignee: International Business Machines Corp., Armonk, N.Y.

[21] Appl. No.: 08/296,219

[22] Filed: Aug. 25, 1994

[51] Int. Cl.[7] .................................................. G09G 5/08
[52] U.S. Cl. ........................... 345/163; 345/158; 345/169
[58] Field of Search ..................................... 345/156, 158, 345/157, 163, 164, 167, 168, 169

[56] References Cited

U.S. PATENT DOCUMENTS

| | | | |
|---|---|---|---|
| 3,941,989 | 3/1976 | McLaughlin et al. | 340/324 R |
| 4,102,493 | 7/1978 | Moreno | 235/415 |
| 4,125,871 | 11/1978 | Martin | 331/66 |
| 4,689,757 | 8/1987 | Downing et al. | 377/13 |
| 4,853,682 | 8/1989 | Asano et al. | 345/169 |
| 4,914,732 | 4/1990 | Henderson et al. | 340/825.17 |
| 5,051,898 | 9/1991 | Wright et al. | 364/200 |
| 5,060,135 | 10/1991 | Levine et al. | 364/200 |
| 5,181,181 | 1/1993 | Glynn | 345/163 |
| 5,204,947 | 4/1993 | Bernstein et al. | 395/157 |
| 5,305,449 | 4/1994 | Ulenas | 395/500 |

*Primary Examiner*—Dennis-Doon Chow
*Attorney, Agent, or Firm*—Lane, Aitken & McCann; Lynn L. Augspurger

[57] ABSTRACT

A hand-held data storage unit which transfers data from a computer to the unit by means of a graphical user interface in the computer controlled by the hand-held data storage unit.

6 Claims, 6 Drawing Sheets

DATA MOUSE

BACKGROUND OF THE INVENTION

1. Field of the Invention

This invention relates to a portable, hand-held, device for transferring data to and from a data processing system via a graphical user interface, and, more particularly, to a hand-held data storage device that generates graphical user input signals to facilitate data transfer.

2. Description of the Prior Art

In the prior art, there are a variety of devices and networks to move data from one data processing system (e.g., a personal computer system) to another data processing system. These include diskettes (e.g., magnetic and optical), local area hardwired networks, various wireless transmission networks, and semi-conductor memory cards.

More specifically to this invention, U.S. Pat. No. 4,102,493 issued to Moreno et al. (Moreno '493) describes a method and apparatus for transporting data from one device to another. In Moreno '493, data is transferred from a processor system to a portable card in which data is electronically stored, modified, and transferred to another processor system. Moreno '493 transports data by means of a hand-held device, but the device does not provide a user interface to facilitate the transfer (upload or download) of the data.

U.S. Pat. No. 4,125,871, issued Nov. 14, 1987, to Martin et al. (Martin '871) describes a portable data entry device in which a user keys in data, which is stored in the device until a later time when the data is uploaded to a computer system. The portable data entry device is wholly contained within a small housing. The device includes an electronic memory capable of storing a plurality of multiple character records and includes manually operable controls for sequencing through the memory for review and updating of previously entered data. A connector is provided on the housing by which the device can be directly connected to a data system for the readout of the stored data. The device is self powered and contains circuitry operative to conserve available energizing power.

U.S. Pat. No. 4,689,757, issued to Downing et al. (Downing '757), describes an apparatus for transporting information captured at a coin counter to a computer. The system is comprised of a discrete machine event counting module which records and stores a count of machine operation and can include means for recording the time of some selected event or events. The module also stores an identification code for the particular machine. The module can be connected directly through a microprocessor to a central processing center, or it can be located at a machine or at a group of machines.

The transfer unit can then be transported to access means for the central processing center and the information that was obtained from the module will be transferred to centers for processing and tabulation.

Of course, graphical user interfaces which allow a user to generate computer commands by means of a graphical icon display and display pointer are well known and widely used in the art (see, for example, U.S. Pat. No. 5,204,947 and the materials referenced therein). Notwithstanding, in the prior art there is no generally applicable, simple way to transfer data among diverse systems.

SUMMARY OF THE INVENTION

An object of this invention is the provision of a handheld, portable device to facilitate user operation in moving data from one computer system to another computer system or between a computer system and a stand-alone device, such as an automatic teller machine, a stand-alone disk storage unit, an automatic controller, or other devices without a graphical user interface.

Another object of the invention is to provide a portable hand-held device for transferring data between systems without the need for special user input commands.

Briefly, this invention contemplates the provision of a hand-held data storage unit which transfers data from a computer to the unit by means of a graphical user interface in the computer controlled by the hand-held data storage unit. In a preferred embodiment of the invention, a wireless communication link provides two-way communication between the computer and the hand-held data storage unit. The computer's graphic user interface is expanded to provide an icon that transfers data to a hand-held data storage unit in response to a pointer position controlled by the hand-held data storage unit. Data compression and/or encryption may be executed by the computer in response to an icon controlled by the hand-held unit prior to transfer and storage in the unit.

A hand-held data storage unit in accordance with this invention controls a CRT pointer in a similar fashion to a trackball or other pointing device attached to a computer system having a graphical user interface. One frequently used data manipulation operation is a so-called "cut and paste" operation. The operation of "cut and paste" is quite useful and simple to use within a single system. But if a user wants to "cut" from one computer system and "paste" to another computer system, information has to be transferred to diskette or other portable media, or perhaps sent by LAN or WAN since prior art pointer controllers, such as the mouse, trackballs, and other pointer control methods, do not have the ability to transport data. The invention here embodied by virtue of its portability and data storage ability in combination with its pointer control and combined with an appropriate icon representation associated with the graphical user interface permits a very simple method of "cutting" information from one computer system and "pasting" this same information on another computer system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
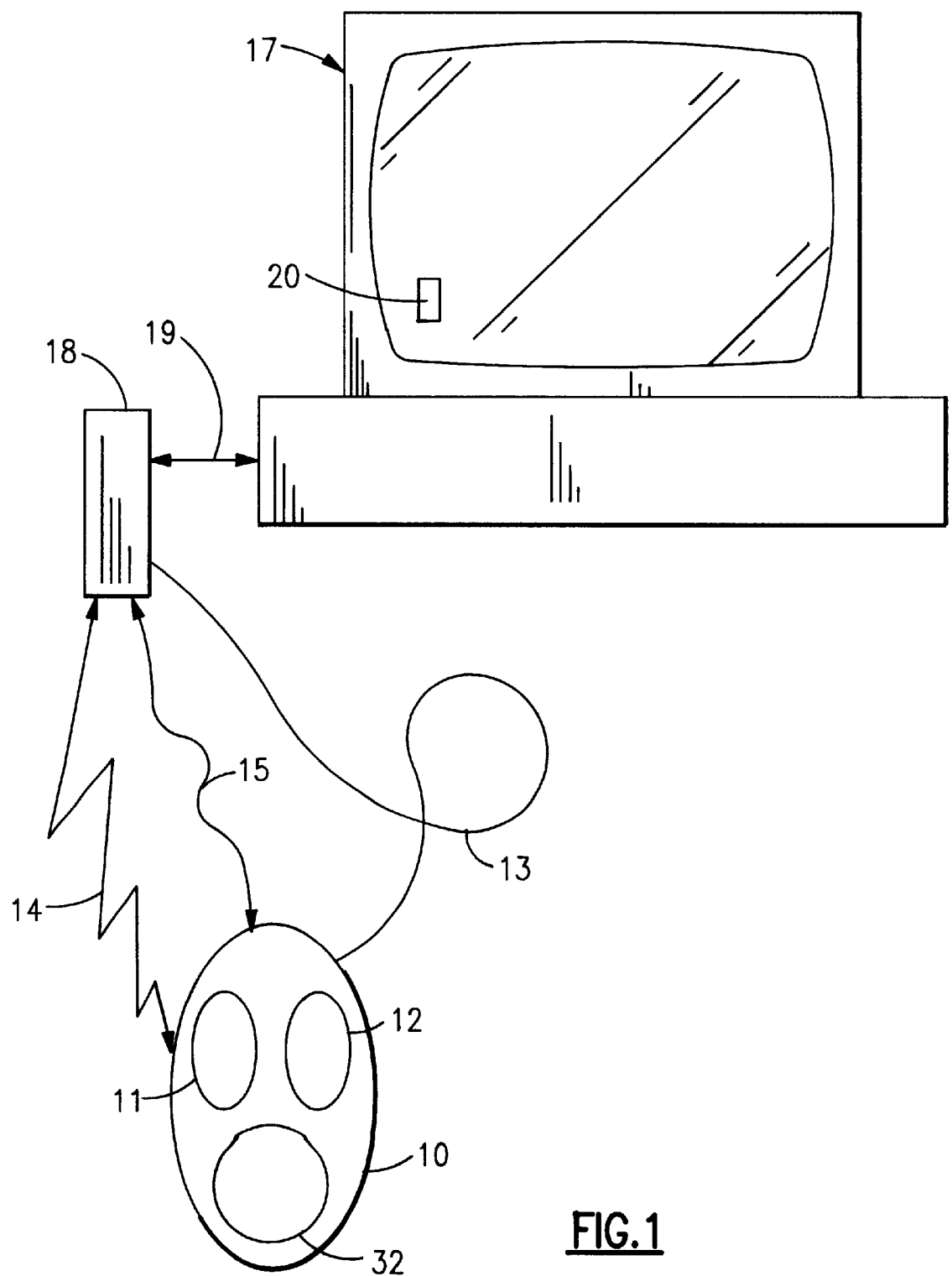
FIG. 1 shows schematically an overview of the preferred embodiment and particularly shows a hand-held data storage device linked via wireless communication channel to a computer.

Turning now to the invention in greater detail, FIG. 1 illustrates a preferred embodiment in which a hand-held data storage unit 10 is wirelessly coupled (e.g., low power electromagnetic ("radio") waves 14) to a computer indicated at 17, equipped with graphical user interface software, such as that supported by the IBM OS2 operating system. The use of radio waves allows greater freedom of placement for the unit 10, thus greater freedom and ease of use for the user. Wireless optical communication links 15 and hardwired communications links 13 may be used also, if desired. A standard mouse configuration is shown, with two "clicker" buttons 11, 12 and a mouse ball assembly 32. Additional buttons can be supported if necessary, as can additional controls. The computer 17 has a display screen 20 and additional hardware 18 to communicate with hand-held data storage unit 10. In the preferred embodiment, hardware 18 is connected via serial cable 19 to computer 17. Thus, handheld data storage unit 10 is (insofar as being a pointing device) similar in its operation to a standard serial mouse.

Figure 2:
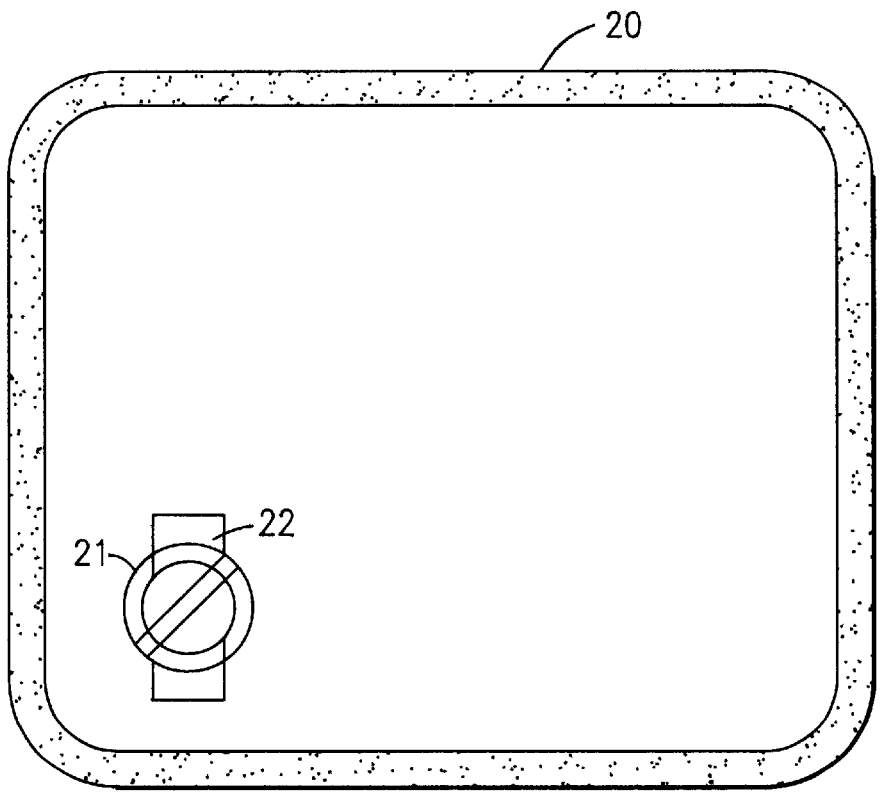
FIG. 2 shows an exemplary view of the computer screen when the invention described herein is not linked to the computer.

FIG. 2 illustrates pictorially display screen 20 associated with computer 17. It has a special icon 22 for supporting the hand-held data storage unit 10 and a universal symbol 21 to indicate when unit 10 is not in communication with processor 17.

Figure 3:
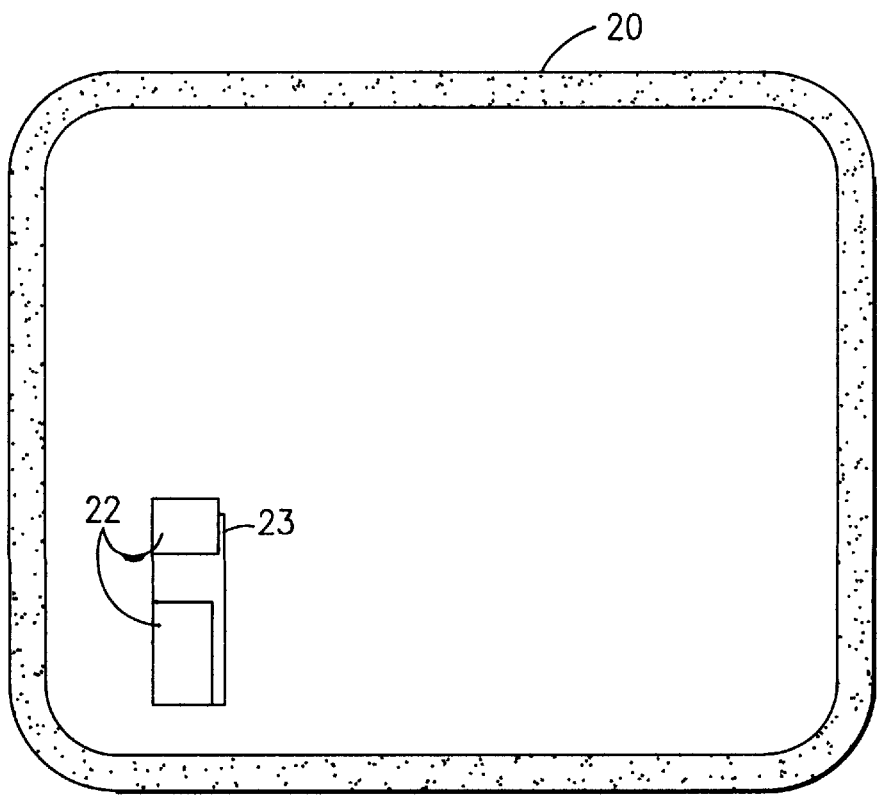
FIG. 3 shows an exemplary view of the computer screen when the invention described herein is linked to the computer.

FIG. 3 illustrates a typical computer screen 20 that has an icon 22 supporting the hand-held data storage unit 10 where the unit is coupled to computer 17. State information 23 is displayed that indicates how much memory capacity has been used in the unit 10. Unit 10 is coupled to the computer 17 when communication between it and computer 17 is established. If a standard mouse is attached to the computer, icon 22 would be displayed with an appropriate symbol, such as the letter "M", to signify an attached standard mouse. Alternatively, other icon images could be displayed to signify the connection of a standard mouse.

Figure 4:
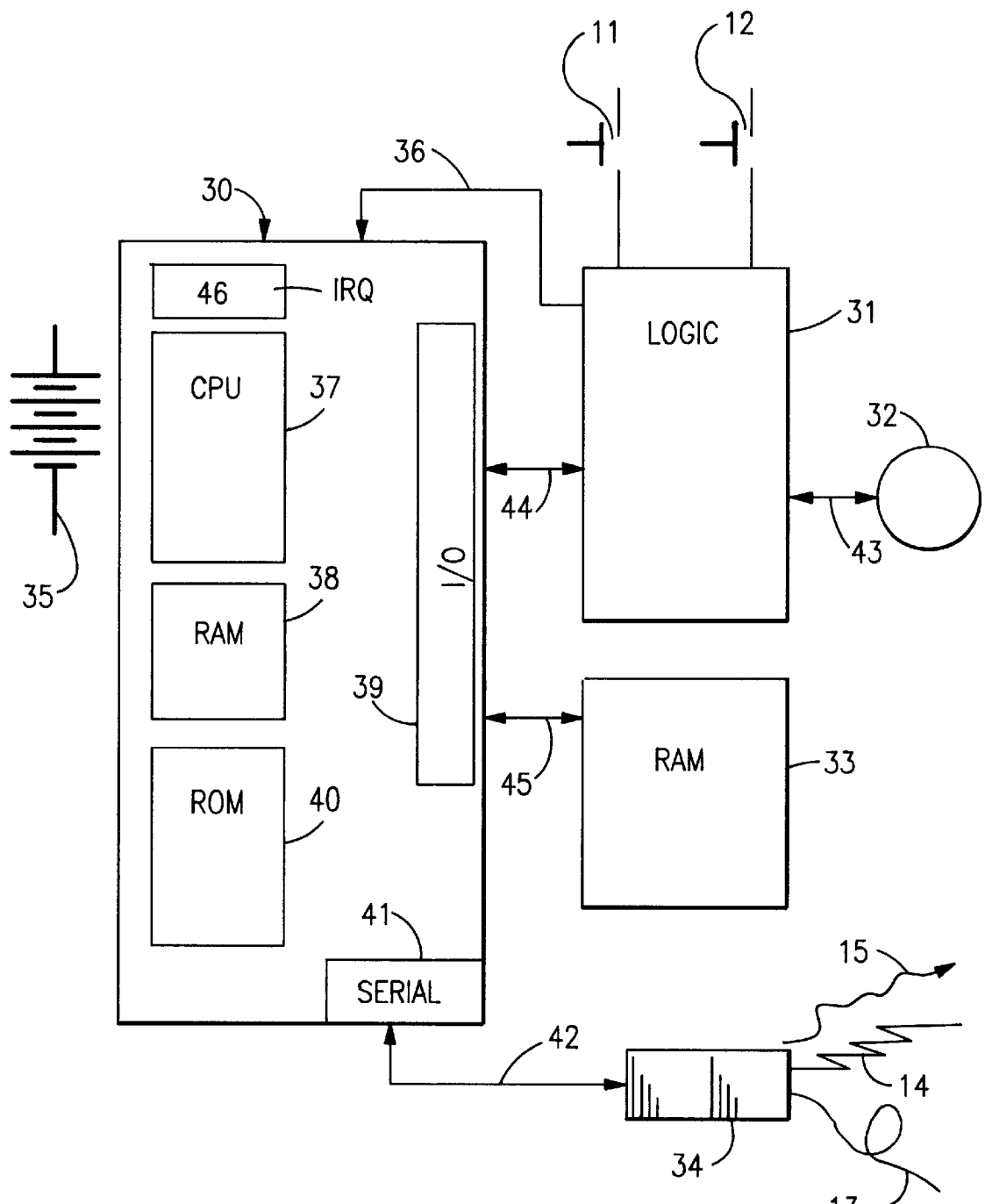
FIG. 4 is a block diagram of one embodiment of the invention described herein.

A block diagram of the hand-held data transfer unit 10 is shown in FIG. 4. A one-chip processor indicated by the general reference number 30 with onboard CPU 37, RAM 38, program storage 40, input/out capability 39, and serial port 41 interfaces through logic 31 to the left mouse button 11, right mouse button 12, and with the mouse ball assembly 32. A storage unit 33 external to processor 30 and coupled thereto by bus 45 is provided to store data. Typically, with currently available components, storage unit 33 would contain about 60K bytes of SRAM. However, as storage component technology advances, the anticipated size of the storage unit 33 will become larger.

In this preferred embodiment, a transceiver 34 transmits and receives radio frequency signals (indicated graphically at 14) coupling the unit 10 to computer 17 via interface 18.

Alternative wireless coupling indicated at 15 and hard wired coupling indicated at 13 are also practicable. A serial data stream from the processor 30 via serial port 41 and connection 42 modulates a radio frequency carrier signal of transceiver 34. Similarly, a modulated signal received from computer 17 is demodulated by circuit 34 and received as a serial data stream by processor 30 via serial port 41. Power is provided by a battery 35, with due consideration of power consumption by processor 30, logic 31, and storage 33 which should all be CMOS or equivalent low power logic. In addition, a processor 30 "sleep" mode is used in this preferred embodiment.

The logic 31 in FIG. 4 has multiple wire connections 44 to processor 30. This logic 31 also has multiple wire connections 43 to mouse ball assembly 32. The logic 31 has an external interrupt signal wire 36 to an interrupt pin 46 of the processor 30. An interrupt signal on wire 36 is an event which causes processor 30 to awaken from its "sleep" mode.

Figure 5:
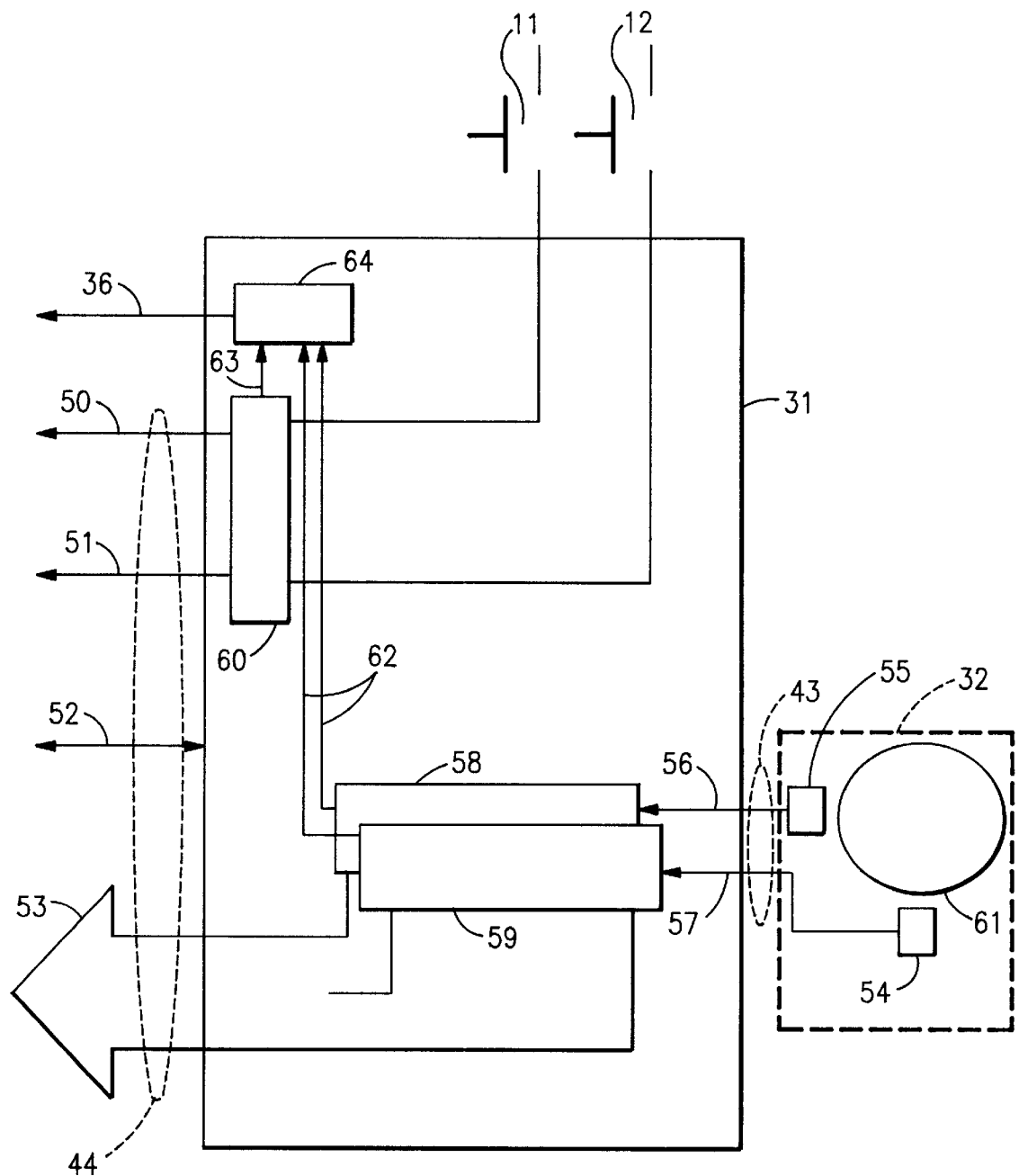
FIG. 5 shows detail of certain internal logic of the embodiment of FIG. 4.

FIG. 5 shows a typical implementation of logic 31. This implementation allows serial port 41 to operate at a maximum practical rate. Therefore, the load on processor 30, which would be incurred should processor 30 be required to poll button 11, 12 and mouse ball assembly 32 for activity, is reduced while also facilitating the use of processor 30 "sleep" mode.

FIG. 5 shows the logic to reduce the load on processor 30 and to reduce the power consumption of unit 10. It uses counters 58 and 59 coupled by leads 56 and 57 to revolution pulse generators 55 (X) and 54 (Y) coupled to a mouse ball 61. Counters 58 and 59 are up/down counters, with output signals on lines 62 being emitted when the counter is in a non-zero state. These counters keep track of mouse ball 61 movement even while processor 30 is busy with other tasks. Reading counters 58 or 59 via a bus 53 results in the respective counters being reset to a zero state. Read, chip select, and addressing signals are represented by wires 52, which are a subset of wires 44. Logic circuit 60 debounces and detects a state change of button 11 and button 12; a state change for either button results in a signal on line 63 being emitted. This signal 63 is combined via logic 64 with signals 62 emitted by counter 58 and 59. The resulting signal emitted by logic 64 is applied to wire 36 as an interrupt to processor 30. The debounced change of state of buttons 11 and 12 are also outputted on leads 50 and 51.

Figure 6:
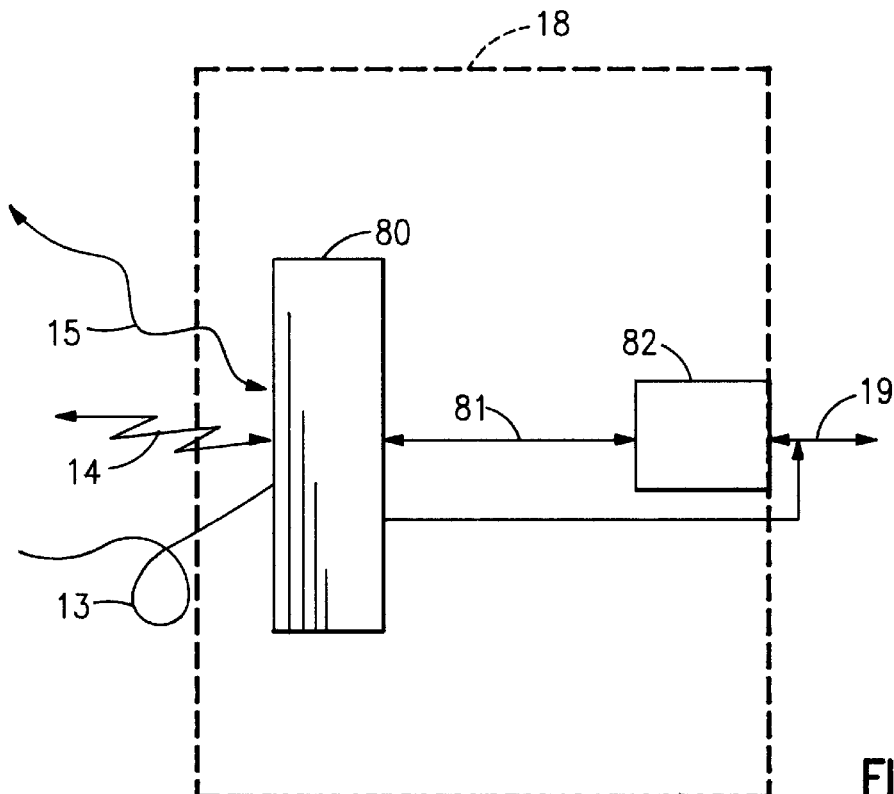
FIG. 6 shows a block diagram of a computer interface for the preferred embodiment.

FIG. 6 is a block diagram of the interface module 18. In transmitting data to the unit 10 from the computer 17, a serial data stream received via serial cable 19 modulates a radio frequency carrier generated by an oscillator 82. An rf link 81 couples the modulated carrier signal to a transceiver 80 which transmits the signal to the unit 10. In transmitting data from the unit 10 to the computer 17, the signal received from unit 10 is demodulated by transceiver 80 and the demodulated serial data stream is sent to computer 17 via serial cable 19. Power for the transceiver 80 is taken from the serial cable 19, as only a very low power output radio frequency signal is desired or required.

An example of a command set for the hand-held data transfer unit 10 is:

DIRECTORY--provides a list of the data currently preserved in
    Data Mouse and the free space available. By implication,
    this also provides the size of the Data Mouse total memory.
Name/location/size/chain/ . . . /name/location/size/chain/
freesize/EOF
    Return codes:
        •command successful
        •command not understood
        •storage error
COPY <DM->C> or <C->DM>
    Command to copy data to the portable device 10 or copy data
    from the portable device 10
    Return codes:
        •command successful
        •command not understood
        •storage error
        •insufficient space, command not done
ERASE <name>
    (note: degenerate form of copy--copy over a name with
    length 0)
    Return codes:
        •command successful
        •command not understood -continued

```
    •storage error
    •insufficient space, command not done
FORMAT
  Clear the data stored in portable device 10
  Note that the GUI support should inquire "Are You Sure".
    Return codes:
      •command successful
      •command not understood
      •storage error
DIAG <mode<,subcommand>>
  Execute diagnostics, two modes, one clears memory and one
  does not, with subcommands
    Return codes:
      •command successful
      •command not understood
      •storage error
      •processor ROM checksum failure
      •processor RAM checksum failure
      •other logic error (actually, several)
ACTION <SQUEEK|BLINK|TWITCH>
  (optional, based on capability of DM, preferred embodiment
  does not show the hardware to support this capability)
    Return codes:
      •command successful
      •command not understood
```

Figure 7:
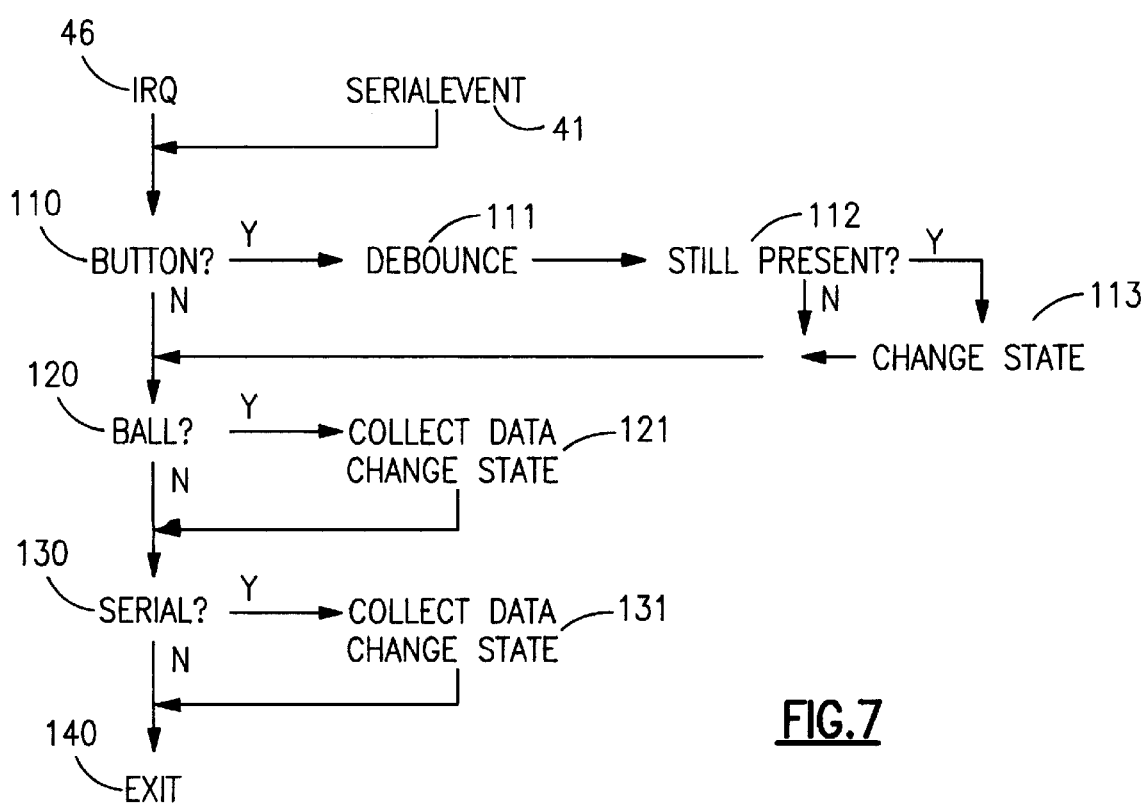
FIGS. 7 and 8 are high level flow diagrams of interrupt handling structure and execution structure of the firmware associated with a preferred embodiment of the invention.
Figure 8:
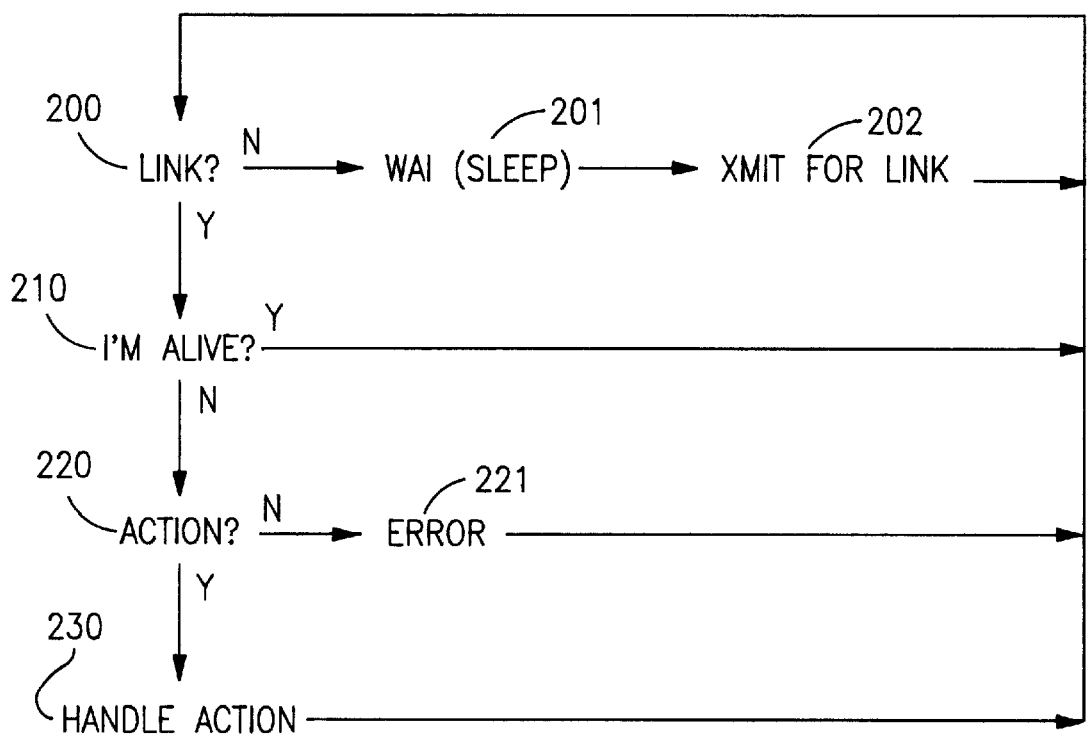

FIGS. 7 and 8 are high level flow charts for certain of the operations of processor 30. The firmware to carry out these operations is coded in permanent storage element 40 (ROM).

FIG. 7 is the interrupt handling micro code flow. An interrupt, either IRQ 46 or from the serial port 41, initiates interrupt handling. Decision 110 determines if the event is a change of state of buttons 11 or 12; this is done by examining information received via I/O port 39 in particular, the lines from logic 44 as compared with the preserved last state of the buttons as preserved in processor RAM 38 of processor 30. If the event is a change of state of one of the buttons 11 or 12, further processing is done by finalizing the debounce of the buttons as shown by block 111, verifying continued presence in block 112, and, if the change of state is confirmed, making the appropriate state variable changes as indicated by block 113. If the event was not a change of state of a button or the change of state of a button or buttons has been handled, then control is passed to a decision block 120 to determine if there has been movement of the mouse ball 61. If so, the appropriate information is gathered and states changes as shown by block 121. If the preceding blocks have completed, a check is made at block 130 to see if serial port 41 has generated an interrupt indicating the completion of transmission or reception of data. If so, the data is collected (if data is being received) or, if necessary, additional data is written to the serial port (if transmission) as represented by block 131. After completing the aforementioned, interrupt handling is completed and the routine exits as shown by block 140. The state information generated by blocks 113, 121 and 131 is used by the general execution code to manipulate data or modify hardware as necessary.

Note that the description of interrupt handling is from a very high level and minor details not necessary to elucidate operation are not shown—for example, the preservation of registers upon entry to the interrupt handling routine, and a check for additional pending interrupts prior to exit via block 140 among other details.

Of particular interest is the use of the interrupt to awaken from power conserving "sleep" mode. Referring now to FIG. 8, the hand-held data storage unit 10, when not linked to a computing system or other device, would reside in "sleep" mode as represented at 201. An interrupt, as described in connection with FIG. 7, awakens processor 30 from its "sleep" mode. After processor 30 completes handling the interrupt (block 202), processor 30 initiates an action to check for a link to computer 17 (for example, at block 200). If no such link is present, processor 30 returns to its sleep mode of operation (block 201). If there is a link connection to the computing system, processor 30 replies to the computing system request with "I'm alive" status (block 110). Next, in block 220, the processor 30 checks to see if any action is to be taken. Actions would be represented by changes to state variables as might be done by blocks 113, 121, 131 of FIG. 7, including the reception of an external request (via serial port 41, represented in FIG. 7 by block 131). The processor 30 handles any required action at block 230. If there is action is to be taken, there was possibly an error on the link.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system for transferring data between one or more computer systems, comprising in combination:

a portable, hand-held, data storage unit, including a microprocessor, a solid-state memory means operatively coupled to said microprocessor, a communications port operatively connected to said microprocessor, and means including said microprocessor for generating graphical user interface control signals;

a computer system with a graphical user interface application program responsive to said graphical user interface control signals;

said computer system transmitting data to said microprocessor via said communication port in response to said graphical user interface control signals;

said microprocessor storing said data in said solid-state storage means; and said microprocessor transmitting said data stored in said memory to said computer system.

2. A portable hand-held data storage unit as in claim 1 wherein said communications port includes a wireless transceiver.

3. A portable hand-held data storage unit as in claim 1 further including a battery for powering said unit.

4. A portable hand-held data storage unit as in claim 3 wherein said microprocessor transfers between a normal operating mode in response to operational inputs and a low power operating mode in the absence of said operational inputs.

5. A portable hand-held data storage unit as in claim 1 wherein said manually operable, graphical user interface control signal generating means includes a rotatable member and counter means to store incremental rotation of said member.

6. A portable hand-held data storage unit as in claim 5 wherein said microprocessor transfers between a normal operating mode in response to operational inputs and a low power operating mode in the absence of said operational inputs.

* * * * *